United States Patent [19]

McAnally et al.

[11] Patent Number: 4,872,492
[45] Date of Patent: Oct. 10, 1989

[54] PNEUMATIC TIRE INFLATOR

[75] Inventors: Marcus E. McAnally, Nashville; Robert E. Gwaltney, Brentwood, both of Tenn.

[73] Assignee: Hennessy Industries, Inc., LaVergne, Tenn.

[21] Appl. No.: 180,086

[22] Filed: Apr. 11, 1988

[51] Int. Cl.$^4$ .............................................. B65B 31/04
[52] U.S. Cl. ........................................ 141/38; 141/83; 141/98; 141/198; 152/415; 137/224
[58] Field of Search ....................... 141/38, 46, 47, 50, 141/54, 55, 83, 98, 198; 152/415; 137/223, 224, 225, 489.5; 128/205.24

[56] References Cited

U.S. PATENT DOCUMENTS

| | | | |
|---|---|---|---|
| 2,094,269 | 9/1937 | Deming | 137/489.5 |
| 2,761,601 | 9/1956 | Van Vooren | 141/38 |
| 3,321,136 | 5/1967 | Trevillian | 137/489.5 |
| 3,357,443 | 12/1967 | Brumm | 137/489.5 |
| 4,227,519 | 10/1980 | Warnow et al. | 128/205.24 |
| 4,421,151 | 12/1983 | Stumpe | 141/38 |
| 4,510,979 | 4/1985 | Hjorth-Hansen | 141/38 |
| 4,583,566 | 4/1986 | Kalavitz et al. | 137/224 |
| 4,763,709 | 8/1988 | Scholer | 141/38 |

FOREIGN PATENT DOCUMENTS 437108 10/1935 United Kingdom ................ 137/225

Primary Examiner—Henry J. Recla
Assistant Examiner—Edward C. Donovan
Attorney, Agent, or Firm—Neuman, Williams, Anderson & Olson

[57] ABSTRACT

A pneumatic tire inflator is provided for use with a source of pressurized air and a device for controlling the flow of air therefrom. The inflator includes first and second air flow circuits, each circuit having an inlet end communicating with the downstream side of the device, and an outlet end. The first circuit is provided with a regulator having an inlet communicating with the first circuit inlet end, and an outlet. The regulator is preset whereby the air discharged from the outlet is at a predetermined tire pressure. A pressure sensitive first valve, biased to normally assume an open position, is provided having a first inlet communicating with the regulator outlet, a valve outlet, and a second inlet, the latter being segregated from the first inlet and outlet by a pressure sensitive member. The pressure sensitive member interrupts communication between the first inlet and the valve outlet when there is a predetermined pressure at said second inlet overcoming the opening bias. An air accumulator is provided in the first circuit having an inlet communicating with the outlet of the first valve. The second circuit includes a pressure sensitive second valve biased to normally assume a close position. The second valve has a first inlet communicating with the inlet end of the second circuit, a second inlet communicating with an outlet of the accumulator, an outlet communicating with the outlet end of the second circuit, and a pressure responsive element effecting opening of the second valve.

4 Claims, 2 Drawing Sheets

PNEUMATIC TIRE INFLATOR

BACKGROUND OF THE INVENTION

Various tire inflators for use in garages, service stations and the like have heretofore been available; however, because of certain inherent design characteristics they are beset with one or more of the following shortcomings: (a) they are of complex and costly construction; (b) they are unreliable; (c) they are prone to malfunction; and (d) they are difficult to service and maintain.

SUMMARY OF THE INVENTION

Thus, it is an object of the invention to provide an improved pneumatic tire inflator which avoids all of the aforenoted shortcomings.

It is a further object to provide an improved pneumatic tire inflator which avoids the use of costly switches and/or solenoids.

It is a still further object to provide an improved tire inflator which utilizes various components of conventional design readily available on the open market.

It is a still further object to provide an improved tire inflator which is readily adaptable to fulfill a wide range of tire pressure demands.

It is an additional object to provide an improved tire inflator of compact and simple design and which prevents over pressurizing the inflated tire.

Further and additional objects will appear from the description, accompanying drawings and appended claims.

In accordance with one embodiment of the invention a pneumatic tire inflator is provided for use with a source of pressurized air and a device associated with the source for controlling the air flow therefrom. The air pressure of the source is greater than the maximum air pressure of the tire to be inflated.

The inflator is provided with a first air flow circuit and a second air flow circuit. Each circuit has an inlet end which is in communication with a discharge side of the device, and an outlet end. The outlet end of the second circuit is in communication with an air valve of the tire to be inflated. The first flow circuit includes a regulator means communicating with the first circuit inlet end. The regulator means is preset whereby the air discharged therefrom through the outlet thereof substantially corresponds to the desired tire pressure. Connected in series with the regulator means outlet is a first inlet of a pressure sensitive first valve, the latter being biased to normally assume an open position. Besides the first inlet, the first valve is provided with an outlet and a second inlet. The second inlet is segregated from the outlet and the first inlet by a pressure responsive means. When there is a predetermined air pressure at the second inlet of the first valve which overcomes the opening bias, the pressure responsive means will effect interruption of the communication between the first inlet and the outlet. Communicating with the outlet of the first valve is an air accumulator, the latter having an outlet in communication with the first circuit outlet end.

The second air flow circuit includes a pressure sensitive second valve which is biased to normally assume a close position. The second valve is provided with a first inlet communicating with the second circuit inlet end, a second inlet communicating with the first circuit outlet end, and an outlet communicating with the second circuit outlet end and with the second inlet of the pressure sensitive first valve.

DESCRIPTION

For a more complete understanding of the invention reference is made to the drawings wherein.

Figure 6:
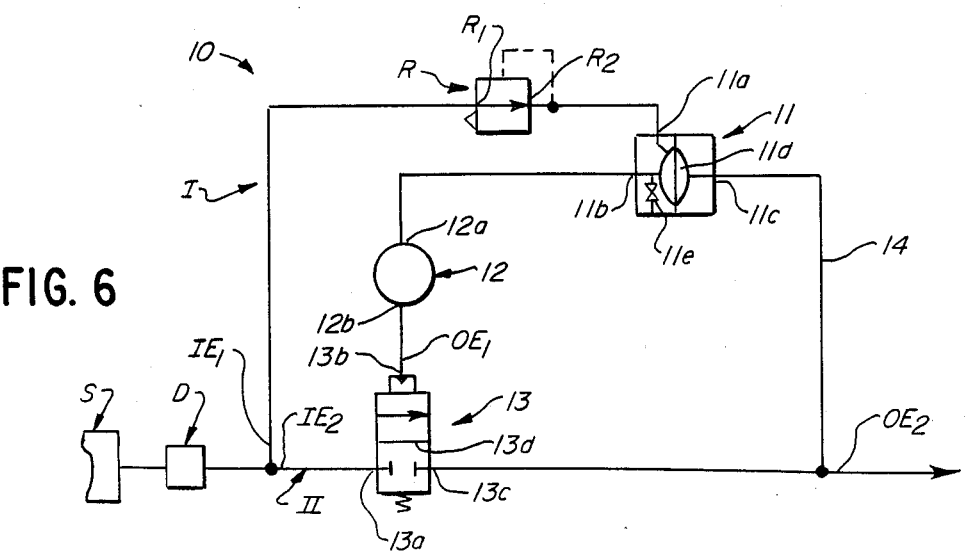
FIG. 6 is a schematic diagram of the inflator of FIG. 1.

Referring now to the drawings and more particularly to FIG. 6, a preferred embodiment of the improved pneumatic tire inflator 10 is shown which is particularly suitable for use in garages, service stations and the like. The inflator is connected to a source S of pressurized air normally having a pressure of 150–200 psi. Associated with the source and disposed downstream thereof is a control device D, which is normally manually operated and controls the air flow to the inflator.

Figure 1:
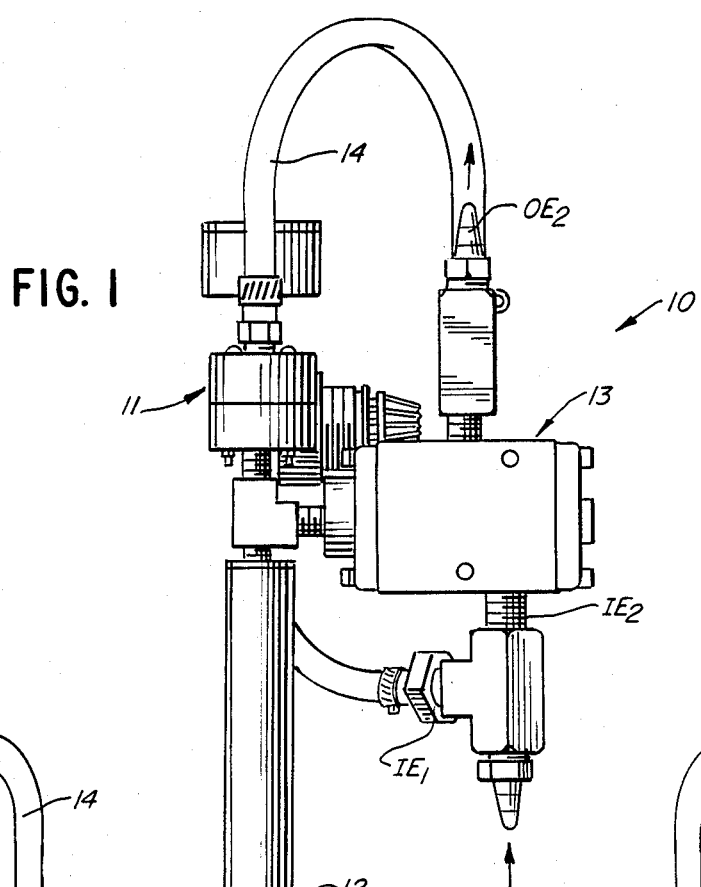
FIG. 1 is a front elevational view of one embodiment of the improved tire inflator.
Figure 2:
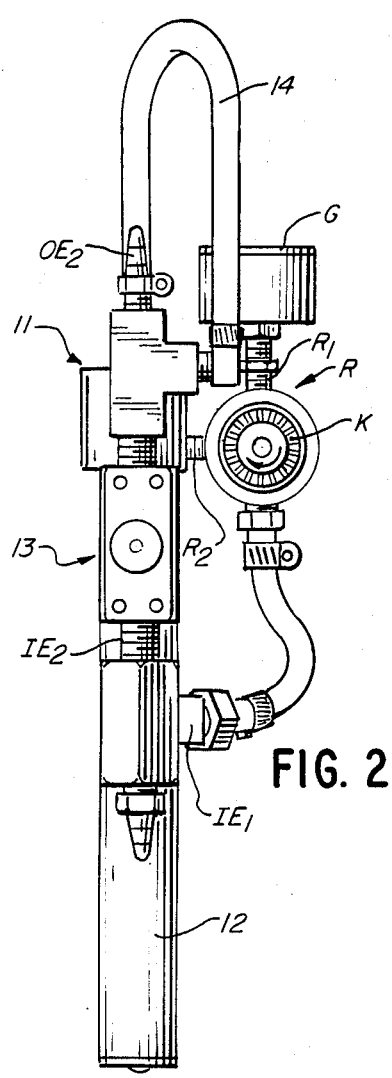
FIGS. 2 and 3 are, respectively, right side and left side elevational views of the inflator of FIG. 1.
Figure 3:
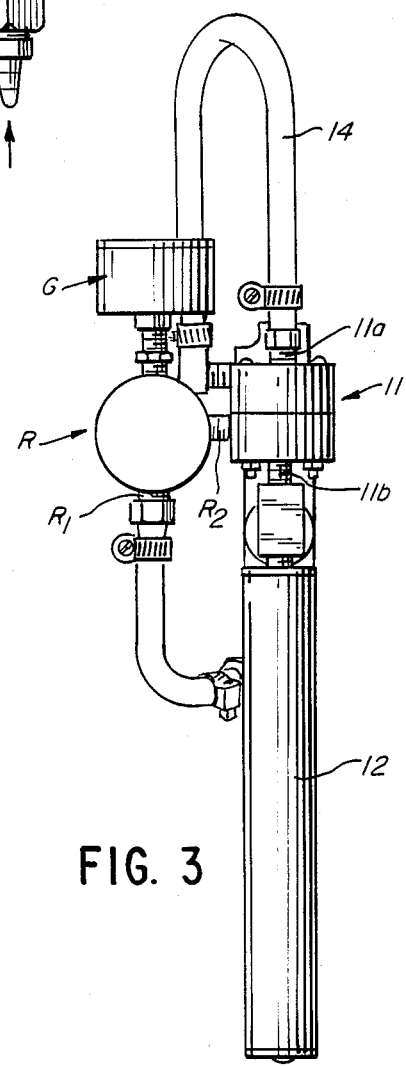
Figure 4:
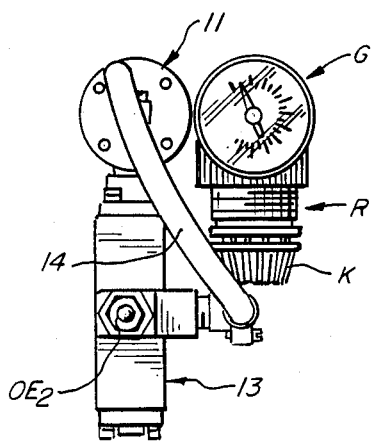
FIGS. 4 and 5 are, respectively, a top view and a back view of the inflator of FIG. 1.
Figure 5:
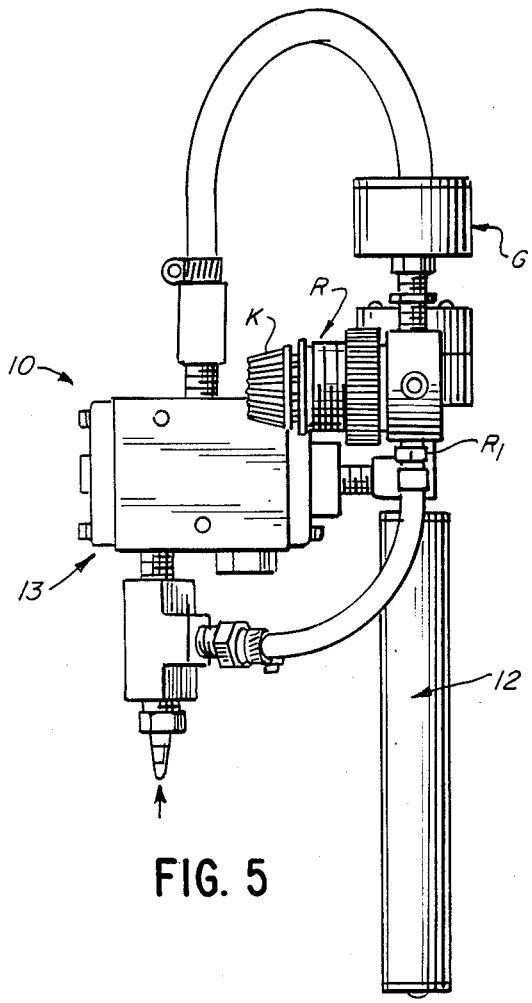

The inflator 10 is provided with first and second air flow circuits I and II, respectively. Each circuit has an inlet end $IE_1$, $IE_2$, which is in communication with the discharge side of the control device D, and an outlet end $OE_1$, $OE_2$, see FIG. 6. The first circuit I includes a regulator R having an inlet $R_1$, and an outlet $R_2$. The regulator is manually adjustable by a knob K, see FIGS. 2 and 4 so that the air discharged through the outlet $R_2$ will be at a predetermined pressure (e.g. not exceeding the maximum pressure of the tire to be inflated). A pressure gauge G is connected to the regulator outlet $R_2$ which registers the air pressure at the outlet. The regulator outlet $T_2$ communicates with a first inlet 11a of a pressure sensitive first valve 11. The valve is provided with an outlet 11b and a second inlet 11c. The second inlet is segregated from the first inlet and the outlet by a pressure sensitive member 11d (e.g. diaphragm) which is normally biased to a valve open position wherein the first inlet 11a and the outlet 11b are in communication with one another.

An air accumulator 12 is included in the first circuit I and has an inlet 12a thereof communicating with the outlet 11b of the first valve. An outlet 12b of the accumulator communicates with the outlet end $OE_1$ of the first circuit I.

The second circuit II includes a pressure sensitive second valve 13 which is provided with a first inlet 13a communicating with the circuit inlet end $IE_2$, a second inlet 13b communicating with the outlet end $OE_1$ of the first circuit, and an outlet 13c communicating with the outlet end $OE_2$ of the second circuit. Disposed within the second valve 13 is a pressure responsive member 13d (e.g. spool) which is biased to normally assume a valve close position wherein communication between inlet 13a and outlet 13c is blocked. The closing bias on member 13d is overcome when the air pressure at the second inlet 13b reaches a predetermined amount which is the normal pressure of the air discharged through the outlet 12b of the accumulator 12. Once the second valve 13 is in the open position, high pressure air will flow through the valve 13 to an air valve, not shown, of the tire to be inflated. It will be noted that the outlet end $OE_2$ of the second circuit II is connected via line 14 directly to the second inlet 11c of the first valve 11 of the first circuit I. The opening and closing of valve 13 will normally occur repeatedly until the tire has been inflated to the desired pressure, determined by the adjustment of the regulator R. Pressure will continue to build up in line 14 causing the pressure at the second inlet 11c to overcome the opening bias of member 11d and thus, interrupt communication between the first inlet 11a and the outlet 11b of valve 11. Once this occurs, the pressure of the air within the accumulator 12 will begin to decrease due to the escape of the air through a bleeder port 11e formed in the valve 11. The size of the bleeder port 11e is such that there is a short delay (e.g. 2–4 seconds) before the air pressure at the second inlet 13b of second valve 13 is insufficient to overcome the closing bias of valve 13 whereupon the latter will automatically resume its normal close position preventing further inflation of the tire.

Thus, an improved tire inflator has been disclosed which is of simple, yet sturdy, inexpensive construction, and is easy to service and maintain. The inflator may be readily adjusted to inflate a tire to a desired pressure and will not cause overpressurizing of the tire.

We claim:

1. A pneumatic tire inflator requiring only a source of pressurized air and a device for controlling the air flow from the source, the air pressure of the source being greater than the desired air pressure of the inflated tire; said inflator comprising first and second air flow circuits, each having an inlet end for communicating with a discharge side of the device and an outlet end, the outlet end of said second flow circuit being adapted to communicate with an inlet valve on the pneumatic tire; the first circuit includes a manually adjustable regulator means having an inlet communicating with the first circuit inlet end and an outlet, said regulator means being preset whereby the air pressure at the outlet thereof substantially corresponds to the desired tire air pressure, a pressure sensitive first valve means biased to normally assume an open position and provided with a first inlet communicating with the outlet of said regulator means, an outlet adapted to normally communicate with said first inlet, a second inlet segregated from said first inlet and said outlet, and pressure responsive means for effecting interruption of the communication between said first inlet and said outlet when there is a predetermined pressure at said second inlet overcoming the opening bias, and air accumulator means communicating with the outlet of said first valve means and being charged with air flowing from the outlet of said first valve means, said accumulator means having an outlet communicating with the first circuit outlet end; said second circuit including a pressure sensitive second valve means biased to normally assume a close position and provide with a first inlet communicating with the second circuit inlet end, a second inlet communicating with the first circuit outlet end, an outlet communicating with the second circuit outlet end, and a pressure responsive means for effecting opening of said second valve means and communication between the first inlet and outlet thereof when the air pressure at the second inlet overcomes the closing bias, and the second inlet of said first valve means and the outlet end of said second circuit being in continuous communication with one another whereby the pressure responsive means of said first valve means is responsive directly to air pressure within the inflated pneumatic tire.

2. The inflator of claim 1 wherein the preset air pressure at the outlet of said regulator means does not exceed a maximum air pressure of the tire to be inflated.

3. The inflator of claim 1 wherein the regulator means, the first valve means and the accumulator means of the first air flow circuit are connected in series relation.

4. The inflator of claim 1 wherein the outlet of the first valve means communicates with a bleeder valve wherein, when the first valve means is in a close position, the pressure within the accumulator means is depleted within a period of about two to about four seconds through said bleeder valve until the air pressure at the second inlet of the second valve means is insufficient to overcome the closing bias of said second valve means.

* * * * *